United States Patent Office 2,845,448
Patented July 29, 1958

2,845,448

AROMATIC SULFONIC ACID ESTERS OF MANDELIC ACID FOR INHIBITION OF ENZYMES

Richard G. Taylor, Olathe, Kans., assignor to The R. G. Taylor Company, Inc., Kansas City, Mo., a corporation of Kansas No Drawing. Application October 26, 1954
Serial No. 464,897

13 Claims. (Cl. 260—456)

This invention relates to a new group of chemical compositions having biological activity, and more particularly to the various aryl, alkyl, and alkyl substituted aryl sulfonic acid esters of mandelic acid.

An enzyme or ferment may be defined as an organic catalyst elaborated by a living cell and capable of functioning independently of the presence of the cell. An enzyme acts by catalysis, i. e., it increases the velocity of a chemical reaction without itself being permanently changed. Substances which decrease the activity of enzymes are known as enzyme inhibitors. The chemical compounds of the present invention produce enzyme inhibition, and are particularly useful in treating burns and sunburns, in neutralizing toxic amines produced by bacteria and micro-organisms, and in neutralizing various amines produced by animal metabolism especially in faulty or abnormal metabolism.

It is an important object of this invention to provide new compositions capable of interfering with the series of interlinked reactions or the physiochemical processes that result in biological activity by producing a reaction of competitive inhibition in biological systems.

It is another important object of the present invention to provide a novel group of ester acids having molecular characteristics for bringing about chemical antagonism when used in biological systems, to interfere with the enzymatic processes thereof.

Still another important object of this invention is to combine the sulfonic acids and the carboxylic acids, as well as an ester linkage, in a simple molecule, whereby to introduce a solubilizing group into the biologically active compound and to thereby greatly alter the activity of the compound.

It is another object of this invention to provide new compositions having a carboxylic acid group, a sulfonic acid group or a hydroxyl group introduced into the molecular structures thereof so that the same will be rapidly absorbed and readily excreted.

Another object of this invention is to provide chemical compositions that are good biostatic agents by virtue of being soluble in water and providing for polar molecules that may be hydrogen bonded, thereby rendering the same effective in either the enzyme or the substrate systems.

It is an aim of this invention to provide for new compositions having optical activity, whereby to obviate reduction or complete loss of biological activity.

It is another object of this invention to provide new chemical compositions that will enter into the all important conjugation reactions that are carried on enzymatically in biological systems.

The aforementioned aryl, alkyl, and alkyl substituted aryl sulfonic acid esters of mandelic acid are valuable in that they interfere with enzymatic processes in biological systems and may be also used as bacteriostatic and fungistatic agents. They also exert a specific detoxifying action on amines that are produced by enzymatic decarboxylation of amino acids in the biological systems, and may therefore, be advantageously used in producing compositions having biological activity.

As above indicated biological activity is either the end result of a series of interlinked reactions or the result of an interference with a perfectly balanced system of interdependent physiochemical processes, and interference with such reactions and/or processes will produce variable effects on biological activity. Interference by neutralization occurs whenever one of the reactants in a system is removed from the sphere of reaction, and this can be accomplished by setting up an irreversible reaction among the reactants of a biological system. If one reactant in a series has a choice of reacting with either of two substances, interference by competition may be the result and the process may be referred to as chemical antagonisms. Competitive inhibition is highly specific and may involve enzyme systems or diverse chemical systems, the competing substance usually bearing some resemblance in structure or in reactivity to the metabolite. The value of the compositions hereof being capable of exerting competitive inhibition in biological systems can, therefore, be fully appreciated.

It is an achievement of modern biochemistry, enzymology, and pharmacology to be able to predict with some degree of certainty the types of molecular modifications that may assist in the production of an antagonistic substance, and innumerable cases of such chemical antagonisms may be cited. Prostigimine inhibits the hydrolysis of acetylcholine by choline esterase; salicylic acid is bacteriostatic toward organisms which synthesize pantothenic acid; amines and amides are acetylated in the body to bring about their detoxification, and the much studied antagonisms between the sulfonamides and p-amino benzoic acid may be mentioned as a few such examples. The ester acids hereof are particularly valuable in bringing about similar chemical antagonisms in biological systems.

Bacteriostatic activity may well be considered as a type of biological antagonism—a competition between bacterial enzymes, a chemical substance or substances, and a substrate—the food of the bacteria, such competition being a function or functions of molecular configuration and physiochemical properties, chief of which is solubility in water.

The carboxylic acid group has good solubilizing characteristics, and its introduction into a biologically active compound may increase its activity, or it may decrease or even destroy its activity. There is a close parallel between the hydroxyl group and the $SO_3H$ group of the sulfonic acids, as the latter is also a very strong solubilizing group. Esters of carboxylic acids and sulfonic acids are likely to have greater biological activity than the free acids because membrane permeability seems to be a function of dissociated molecules and both these classes of acids are highly ionized.

Salts of the carboxylic acids and the sulfonic acids would likely be hydrolyzed to free acids, and the amides of the acids would be expected to have different biological activity than the free acids; however, hydrolysis of amide to acid may occur in a biological system. The introduction of either a carboxylic acid group or a sulfonic acid group into a molecule speeds up its rate of adsorption and excretion, and often the same may be said of the hydroxyl group. Ease and rapidity of excretion of a substance is essential for low toxicity, and such properties are characteristic of the compositions forming the subject matter hereof.

As has been mentioned, solubility in water is a very desirable property of a composition that is to be utilized by biological systems; it is then not necessary to use troublesome or toxic solvents. The carboxylic acid group and the sulfonic acid group provide for water solubility, as well as, for polar molecules that may be hydrogen bonded. Those phenomena permit differential solubilities and partition coefficients, and such molecules may orientate between enzyme systems and substrate systems in such manner as to affect either system. To be effective, good biostatic agents, such as are about to be described, must possess these properties.

The biological specificity of stereoisomerides has long been known, especially with such substances as the alkaloids, the sugars, and the amino acids. The general concept has grown in importance in recent years, the L-form being biologically active in the highest percentage of cases, whereas the D-form often has little or no biological activity. In a great many biologically active stereoisomerides destruction of optical activity results in reduction or complete loss of activity, and for this reason, it is highly important to this invention that the compositions hereof have good optical activity.

Numerous methods for the production of a great number of aliphatic amines and diamines, as well as aromatic and heterocyclicamines by biological systems are known to biochemists, bacteriologists, pharmacologists, and others. Amines and heterocyclic nitrogen compounds are often extremely toxic to the animal in which they may be produced. It is likewise known that in many instances the animal body detoxifies amines by acylating them. Conjugation of amines is much more likely to occur with acids having nuclear carboxyl groups, or carboxyl groups of phenyl acetic acid or carboxyl groups which are separated from an aromatic ring by a vinyl group such as in cinnamic acid. It is to be found that in either case the following equilibrium is established; release of amine—free amine—acylated amine. Such conjugation reactions which take place when the compositions hereof are employed form an important feature of the present invention.

Examples of new chemical compositions that are biostatic and that exhibit competitive inhibition and which have been found to fulfill the above objects, as well as methods of producing these compositions, will hereinafter be set forth. Various sulfonates of the oxyalkyl aromatic sulfonate type, the beta-phenyl-ethyl-p-toluene sulfonate type and other similar groupings have been prepared by utilizing the conventional Schotten-Baumann reaction or some modification of the reaction. The procedure is universally standard among organic chemists. A common modification of the Schotten-Baumann reaction is to use pyridine in the place of sodium hydroxide or potassium hydroxide to absorb the hydrochloric acid released from the reaction.

EXAMPLE I

*Toluene sulfo mandelate (p-toluene sulfonic ester of mandelic acid)*

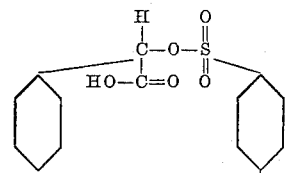

$C_{15}H_{14}O_5S$  M. W. 306.32  M. P. = 186–189° C.

| Theoretical | Found |
|---|---|
| C = 58.81 | C = 58.78 |
| H = 4.62 | H = 4.70 |
| O = 26.12 | O = 25.99 |
| S = 10.46 | S = 10.38 |

After 30 grams of mandelic acid have been dissolved in 45 cc. of 10% aqueous sodium hydroxide, 40 grams of p-toluene sulfonyl chloride are added in small portions. The reaction mix is well stirred throughout the procedure. Additional portions of 10% sodium hydroxide are added from time to time to keep the mixture alkaline, thus preventing the accumulation of free hydrochloric acid. Toward the finish of the reaction the mixture is heated to 70–80° C. to complete the reaction. The free sulfonic ester carboxylic acid is obtained by cooling slightly and acidifying to methyl orange. The acidified solution is filtered with suction and allowed to cool. The product consists of snow white crystals and is soluble in water and bases. It is insoluble to slightly soluble in ether, alcohol, acetone, and other organic solvents.

TEST I

In testing the product the filter paper disc method of Kolmer was used. The plates were streaked with *Neisseria catarrhalis*. The discs were treated with an aqueous solution of p-toluene sulfonyl mandelate to give an approximate plate concentration of 1:20,000 at a distance of 12 mm. from center of plate. The plates were incubated at 37° C. for 24 hours. Zones of inhibition of 18 cm. diameter were obtained repeatedly.

TEST II

Pour plates of bacto-tryptose agar containing an overall concentration of 1:15,000 of p-toluene sulfonyl mandelate were made and autoclaved at 15 pounds per square inch gauge pressure for 15 minutes. Using a heavy suspension of *Brucella abortus*, deep pour plates were made. Control deep pour plates on same media were made. All plates were incubated under 8% $CO_2$ tension for 48 hours. There was good growth on the control plates while the treated plates were negative.

TEST III

Tubes containing exactly 5 ml. of a nutrient tryptose broth were sterilized at 15 pounds per square inch gauge pressure for 15 minutes. The content of several of these tubes was tested quantitatively for histamine. The analyses showed consistent results at 0.6 microgram/ml. of media. Other tubes of the nutrient trptose broth were inoculated heavily with a strain of E. coli isolated from the gastro-intestinal tract of man. The inoculated tubes were incubated at 37° C. for 48 hours. Several of these broth cultures were analyzed quantitatively for histamine. The results were consistent around 2.8 micrograms/ml. Enough p-toluene sulfonyl mandelate was added to the tubes of the incubated cultures to make a concentration in the medium at 1:20,000. These treated cultures were again incubated for 24 hours at 37° C. Chemical analysis of the treated cultures for histamine showed consistently that the histamine values had returned to the original level of 0.6 microgram/ml.

EXAMPLE II

*p-Phenol sulfo mandelate (p-phenol sulfonic ester of mandelic acid)*

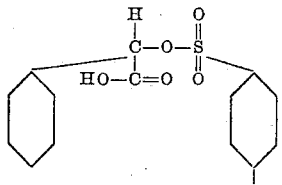

$C_{14}H_{12}O_6S$  M. W. 308.302  M. P. 140–143° C.

| Theoretical | Found |
|---|---|
| C = 54.53 | C = 54.66 |
| H = 3.92 | H = 3.85 |
| O = 31.14 | O = 31.29 |
| S = 10.38 | S = 10.12 |

This composition was prepared by the same procedure used in Example I. Thirty grams of mandelic acid dissolves in 10% NaOH and 40 grams of p-hydroxy benzene sulfonyl chloride were added as above. The product was purified as in Example I and was soluble in the same solvents.

EXAMPLE III

*m-Sulfo-benzoic acid ester of mandelic acid*

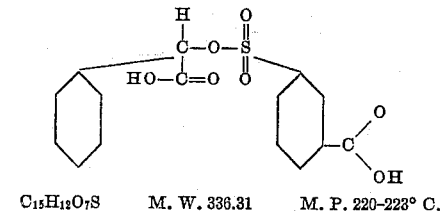

$C_{15}H_{12}O_7S$    M. W. 336.31    M. P. 220-223° C.

| Theoretical | Found |
|---|---|
| C=53.56 | C=53.40 |
| H=3.59 | H=3.70 |
| O=33.30 | O=33.36 |
| S=9.53 | S=9.48 |

Thirty grams of mandelic acid were used as above and 144 grams of M-sulfo benzoic acid were added. The product was obtained and purified in the usual way.

EXAMPLE IV

*m-Xylene sulfo mandelate*

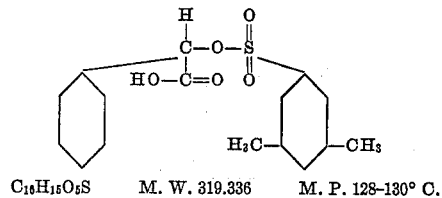

$C_{16}H_{16}O_5S$    M. W. 319.336    M. P. 128-130° C.

| Theoretical | Found |
|---|---|
| C=60.17 | C=60.30 |
| H=4.73 | H=4.94 |
| O=25.05 | O=24.93 |
| S=10.00 | S=9.89 |

Thirty grams of mandelic acid were converted to the sodium salt by the usual procedure. Forty-two grams of M-xylene sulfonyl chloride were added. The product was purified in the usual manner.

EXAMPLE V

*B-naphtho sulfo mandelate*

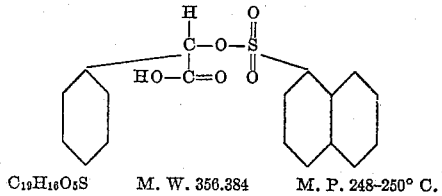

$C_{19}H_{16}O_5S$    M. W. 356.384    M. P. 248-250° C.

| Theoretical | Found |
|---|---|
| C=64.03 | C=65.20 |
| H=4.52 | H=4.46 |
| O=22.41 | O=22.60 |
| S=8.99 | S=8.74 |

This ester is made by the same procedure as used in the preceding examples. The product obtained was a crystalline solid.

In the following examples, the same general process previously described was employed:

EXAMPLE VI

*p-Toluene sulfo-p-isopropyl mandelic acid ester*

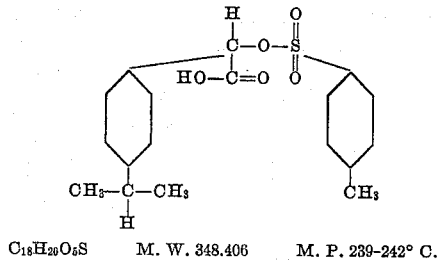

$C_{18}H_{20}O_5S$    M. W. 348.406    M. P. 239-242° C.

| Theoretical | Found |
|---|---|
| C=62.04 | C=61.90 |
| H=5.76 | H=5.88 |
| O=22.96 | O=22.88 |
| S=9.20 | S=9.09 |

EXAMPLE VII

*Benzene sulfo mandelate*

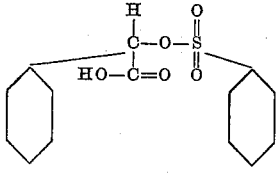

$C_{14}H_{12}O_5S$    M. W. 292.326    M. P. 190-194° C.

| Theoretical | Found |
|---|---|
| C=57.52 | C=57.40 |
| H=4.10 | H=4.19 |
| O=27.37 | O=27.46 |
| S=10.97 | S=10.79 |

EXAMPLE VIII

*n-Butyl sulfo mandelate*

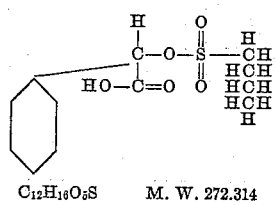

$C_{12}H_{16}O_5S$    M. W. 272.314

| Theoretical | Found |
|---|---|
| C=52.92 | C=53.12 |
| H=5.92 | H=6.09 |
| O=29.38 | O=29.47 |
| S=11.77 | S=11.59 |

EXAMPLE IX n-Amyl sulfo mandelate

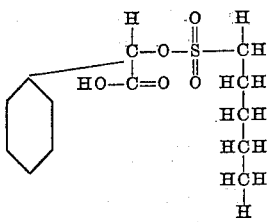

$C_{13}H_{18}O_6S$     M. W. 286.34     M. P. 135–138° C.

| Theoretical | Found |
|---|---|
| C=54.53 | C=54.41 |
| H=6.33 | H=6.25 |
| O=27.94 | O=28.03 |
| S=11.19 | S=11.24 |

EXAMPLE X p-Toluene sulfo p-amino mandelate

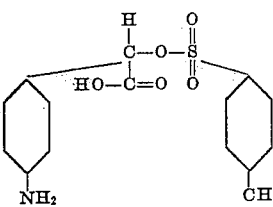

$C_{14}H_{15}O_6SN$     M. W. 309.334     M. P. 120–122° C.

| Theoretical | Found |
|---|---|
| C=54.35 | C=54.18 |
| H=4.87 | H=5.01 |
| O=25.86 | O=25.29 |
| S=10.36 | S=10.23 |
| N=4.52 | N=4.63 |

It is obvious from the above examples that many similar and related compounds may be made. Various alkyl, hydroxyl, aryl, halogenated and otherwise substituted alpha hydroxy phenyl acetic acids may be used. In like manner different alkyl, aryl, hydroxyl, halogen acid otherwise substituted sulfonic acids may be used. Aliphatic sulfonic acids may be used as well as the various naphthol sulfonic acids and substituted naphthol sulfonic acids.

In the same way, many other alkyl sulfonic acid esters of mandelic acids have been prepared. For example, the following alkyl sulfonic acid esters of mandelic acid have been prepared:

Methyl sulfonic acid ester of mandelic acid
Ethyl sulfonic acid ester of mandelic acid
Octyl sulfonic acid ester of mandelic acid
Dodecyl sulfonic acid ester of mandelic acid
Octadecyl sulfonic acid ester of mandelic acid Each of these chemicals were found to have the desirable properties of enzyme inhibition previously discussed.

Having thus described the invention what is claimed as new and desired to be secured by Letters Patent is:

1. An enzyme inhibitor having the formula:

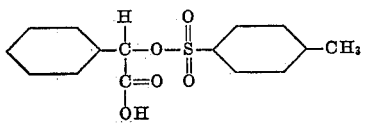

2. An enzyme inhibitor having the formula:

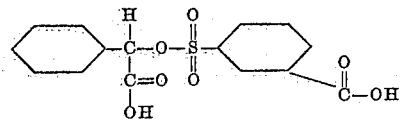

3. An enzyme inhibitor having the formula:

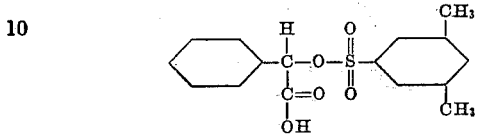

4. An enzyme inhibitor having the formula:

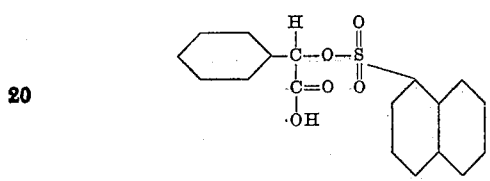

5. An enzyme inhibitor having the formula:

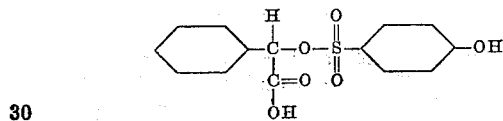

6. The method of preparing

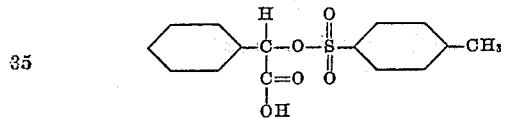

which comprises dissolving a quantity of

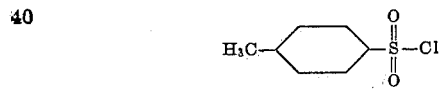

in an alkaline medium to produce a solution; subsequently admixing said solution and at least a stoichiometric proportion of

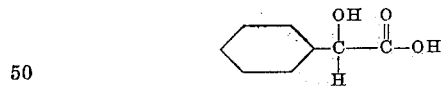

and maintaining the admixture at an alkaline pH until the reaction has gone to completion.

7. The method of preparing

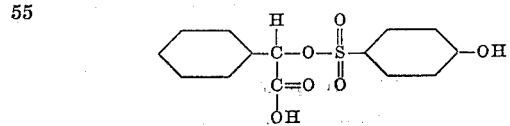

which comprises dissolving a quantity of

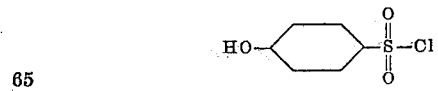

in an alkaline medium to produce a solution; subsequently admixing said solution and at least a stoichiometric proportion of

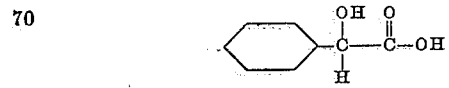

and maintaining the admixture at an alkaline pH until the reaction has gone to completion.

8. The method of preparing

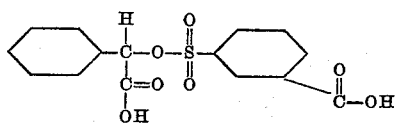

which comprises dissolving a quantity of

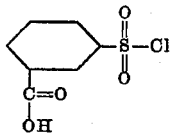

in an alkaline medium to produce a solution; subsequently admixing said solution and at least a stoichiometric proportion of

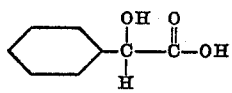

and maintaining the admixture at an alkaline pH until the reaction has gone to completion.

9. The method of preparing

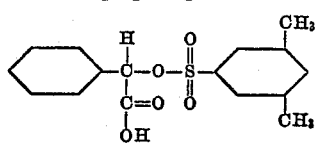

which comprises dissolving a quantity of

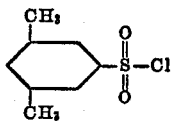

in an alkaline medium to produce a solution; subsequently admixing said solution and at least a stoichiometric proportion of

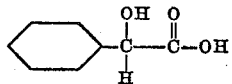

and maintaining the admixture at an alkaline pH until the reaction has gone to completion.

10. The method of preparing

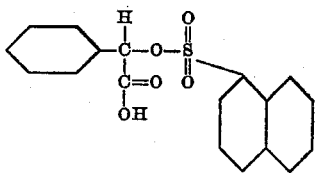

which comprises dissolving a quantity of

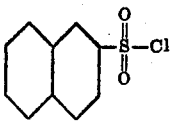

in an alkaline medium to produce a solution; subsequently admixing said solution and at least a stoichiometric proportion of

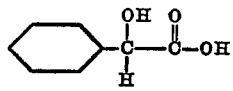

and maintaining the admixture at an alkaline pH until the reaction has gone to completion.

11. An enzyme inhibitor having the general formula:

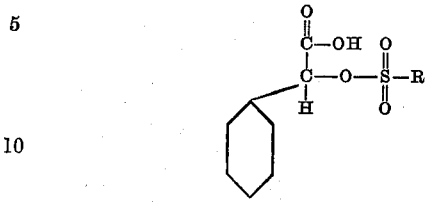

wherein R is a radical selected from the group consisting of phenyl, tolyl, hydroxy phenyl, carboxy phenyl, xylyl, naphthyl, and saturated alkyl.

12. An enzyme inhibitor having the general formula:

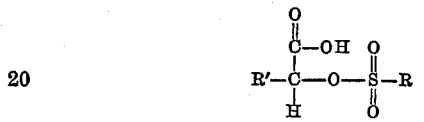

wherein R is a radical selected from the group consisting of phenyl, tolyl, hydroxy phenyl, carboxy phenyl, xylyl, naphthyl, and saturated alkyl, and wherein R' is a radical selected from the group consisting of saturated alkyl phenyl, and amino phenyl.

13. A method of preparing an enzyme inhibitor having the general formula:

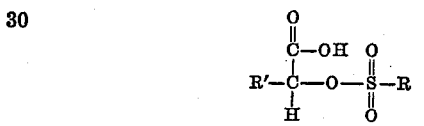

comprising the steps of dissolving a quantity of a compound of the general formula:

in an alkaline medium to produce a solution; subsequently admixing said solution and at least a stoichiometric proportion of a compound of the general formula:

and maintaining the admixture at an alkaline pH until the reaction has gone to completion, R and R' in the above formulas indicating radicals selected from groups consisting of phenyl, tolyl, hydroxy phenyl, carboxy phenyl, xylyl, naphthyl and saturated alkyl, and saturated alkyl phenyl and amino phenyl respectively, and X indicating a halogen.

References Cited in the file of this patent
UNITED STATES PATENTS

| | | |
|---|---|---|
| 1,550,589 | Spengler et al. | Aug. 18, 1925 |
| 2,148,928 | Meuron | Feb. 28, 1939 |

OTHER REFERENCES

Lichtenberger et al.; Bull. Soc. Chim. France (1948), pp. 995–1001.

Fieser & Fieser; Organic Chemistry, 2nd ed. 1950 (p. 668).